TERMINAL FOR ELECTRONIC COMPONENT

Filed Dec. 30, 1963

INVENTOR.
FREDERICK HORWITZ
BY
James and Franklin
ATTORNEYS

United States Patent Office 3,267,409

Patented August 16, 1966

3,267,409

TERMINAL FOR ELECTRONIC COMPONENT

Frederick Horwitz, Woonsocket, R.I., assignor to General Instrument Corporation, Newark, N.J., a corporation of New Jersey Filed Dec. 30, 1963, Ser. No. 334,281
5 Claims. (Cl. 339—144)

This invention relates to electronic components, especially miniature or sub-miniature glass-encased diodes, and more particularly to the terminals thereof.

The general object of the present invention is to improve electronic components and their manufacture. A more particular object is to improve the manufacture of diodes of the clip-in type which are sealed in glass.

Miniature and sub-miniature glass diodes are commonly manufactured with relatively long flexible leads which are soldered into the circuitry utilizing the same. However, because a point contact diode may wear out or go bad, it is sometimes preferred to provide the circuitry with a holder having spring clips which so receive the diode that it is readily removable and replaceable without soldering. For this purpose the diode is provided with relatively short thick cylindrical terminals. This complicates the manufacture of the component. In one form, the diode is housed in a plastic housing which is open-ended, and relatively large in diameter. The point of the diode is mounted on one terminal; the base is mounted on the other terminal; and these parts and the inner ends of the terminals are pushed into the housing to complete the product. The diode is not sealed.

For a so-called "glass diode," that is, one in which the diode is truly hermetically sealed in a glass casing, it is necessary to provide a glass-to-metal seal at each end. This is feasible around a slender lead wire made of appropriate metal or metals, such as "Dumet" wire and "Kovar" wire. However it is not feasible to provide a glass-to-metal seal if the terminal diameter is a large fraction of the diameter of the glass body. In the case of a subminiature glass diode of the clip-in type, the terminal diameter may approach or even exceed the glass diameter.

A glass diode with clip-in terminals has been made, but only by a complex and expensive procedure, and with a glass body substantially larger than is the case with a sub-miniature glass diode.

Accordingly, a main object of the present invention is to improve the manufacture of clip-in terminals for miniature and sub-miniature glass diodes, by modifying ordinary slender solder-in lead wires.

To accomplish the foregoing general objects, and other more specific objects which will hereinafter appear, my invention resides in the electronic component and terminals therefor and their relation one to the other, as are more particularly described in the following specification. The specification is accompanied by a drawing in which.

Figure 1:
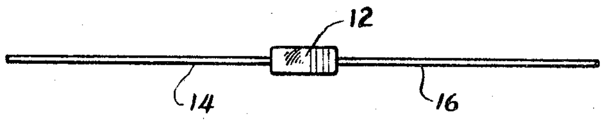
FIG. 1 shows a sub-miniature glass diode with solder-in terminals.

Referring to the drawing, and more particularly to FIG. 1, I there show a conventional sub-miniature glass diode comprising a glass body 12 containing the semiconductor diode elements, and lead wires 14 and 16 extending from the ends of the glass body. The lead wires are relatively long, thin and flexible and are usually made of a special metal particularly adapted for the necessary glass-to-metal seal at the ends of the body 12. In the particular case illustrated, the wires 14, 16 are made of Dumet metal.

Figure 2:
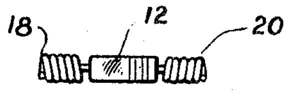
FIG. 2 shows the same component with each terminal coiled to form a cylindrical helix.

In accordance with my improvement, the manufacturer uses identically the same glass diode for the manufacture of a clip-in diode. For this purpose, the lead wire 14 is tightly coiled into a cylindrical helix shown at 18 in FIG. 2; and the lead wire 16 is similarly tightly coiled to form a cylindrical helix 20. These are preferably but not necessarily coaxial with the glass body 12.

The terminals 18 and 20 are then coated with solder. In practice, they are dipped in solder. The solder connects and short-circuits the coils of the helix, as is shown at 22 in FIG. 3. This is important in order to avoid the possibility of any part or all of the terminal acting as an inductor, for the component commonly works with high-frequency energy, and any such stray inductance would be unacceptable. The solder has additional benefit in improving the shape and strength of the terminal by filling the crevices or interstices between coils. It also affords good surface contact between the terminal and the spring clip of the holder which receives the same. The clips may be coated with corrosion resistant metal, and for important apparatus may be plated with gold or silver.

Figure 3:
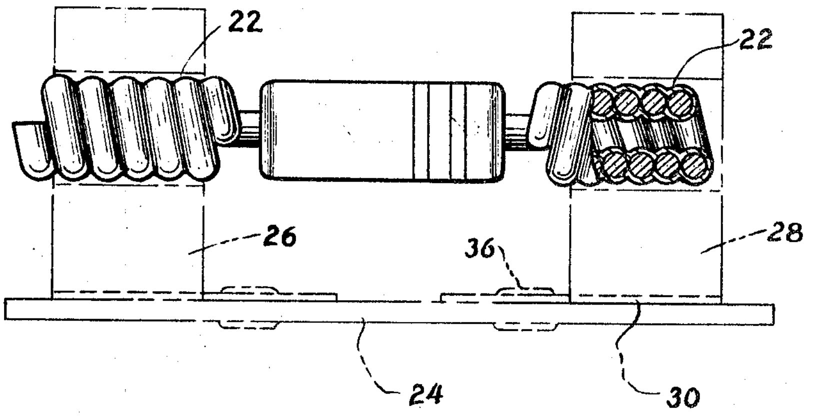
FIG. 3 is a similar view drawn to enlarged scale and showing the terminals after being coated with solder.

FIG. 3 indicates a holder in broken lines, there being an insulation base 24 carrying spaced resilient pedestals or clips 26 and 28.

Figure 4:
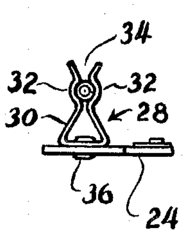
FIG. 4 is an end view of a holder with the glass diode mounted therein.

Referring now to FIG. 4, the pedestal or clip 28 consists of a base 30 with upstanding arms shaped at 32 to receive the terminal, and flared or divergent at 34 to facilitate pushing the terminal into the spring clip. The base 30 is enlarged to receive an eyelet 36 which mounts the spring clip on the insulation base 24. Additional lugs received in slots may hold the clip against rotation on the base.

The particular sub-miniature glass diode here illustrated has a glass body which is only 0.095 inch in diameter and 0.265 inch long. The Dumet lead wires have a diameter of about 0.020 inch. The are 1½ inches long, and this length is adequate to be tightly coiled into the desired cylindrical helix for the clip-in terminal.

It is believed that the construction and method of manufacture of my improved electronic component with clip-in terminals, as well as the advantages thereof, will be apparent from the foregoing detailed description. It will also be apparent that while I have shown and described the invention in a preferred form, changes may be made without departing from the scope of the invention as sought to be defined in the following claims. In the claims, the term "solder" is not intended to exclude any other liquid or molten conductive substance which will harden and which may be used for the intended purpose of short-circuiting the coils of the helix.

I claim:

1. A miniature or sub-miniature glass diode having short heavy clip-in terminals, said terminals each consisting of a long thin flexible lead sealed to the glass and tightly coiled into a short cylindrical helix, said helix being coated with solder.

2. A miniature or sub-miniature glass diode having short heavy clip-in terminals, said terminals each consisting of a long thin flexible lead made of Dumet wire sealed to the glass and tightly coiled into a short cylindrical helix, said helix being coated with solder, the glass body of the diode being generally cylindrical and the helix being substantially coaxial with the cylindrical body.

3. A small electronic component having short heavy clip-in terminals, said terminals each consisting of a long thin flexible lead coiled into a short cylindrical helix, said helix being coated with solder in order to fill the crevices between the coils and to connect each coil to its adjacent coils without constituting a soldered connection to any other lead or circuitry, the reslting short heavy terminals being adapted to be detachably received with a frictional slip fit in the resilient terminals of a clip-in socket.

4. A small electronic component having short heavy clip-in terminals, said terminals each consisting of a long thin flexible lead coiled into a short cylindrical helix, said helix being coated with solder in order to fill the crevices between the coils and to connect each coil to its adjacent coils without constituting a soldered connection to any other lead or circuitry, the body of the component being generally cylindrical and each helix being substantially coaxial with the cylindrical body and extending in opposite directions from the ends of the body, the resulting short heavy terminals being adapted to be detachably received with a frictional slip fit in the resilient terminals of a clip-in socket.

5. A miniature or sub-miniature glass diode having short heavy clip-in terminals, said terminals each consisting of a long thin flexible lead sealed in an end of the body of the diode and tightly coiled into a short cylindrical helix, said helix being coated with solder in order to fill the crevices between the coils and to connect each coil to its adjacent coils without constituting a soldered connection to any other lead or circuitry, the resulting short heavy terminals extending in opposite directions from the ends of the glass body of the diode and being adapted to be detachably received with a frictional slip fit in the resilient terminals of a clip-in socket.

References Cited by the Examiner

UNITED STATES PATENTS

| | | | |
|---|---|---|---|
| 744,650 | 11/1903 | Varley | 339—278 X |
| 2,466,192 | 4/1949 | Wood | 339—275 X |
| 2,902,629 | 9/1959 | Little et al. | 339—17 X |

PATRICK A. CLIFFORD, *Primary Examiner.*

W. DONALD MILLER, *Examiner.*